(12) United States Patent
Watts

(10) Patent No.: US 11,540,456 B2
(45) Date of Patent: Jan. 3, 2023

(54) TREE STUMP GRINDER

(71) Applicant: MULTI-TIP DESIGNS LIMITED, Oxfordshire (GB)

(72) Inventor: Patrick Watts, Oxfordshire (GB)

(73) Assignee: MULTI-TIP DESIGNS LIMITED, Oxfordshire (GB)

( * ) Notice: Subject to any disclaimer, the term of this patent is extended or adjusted under 35 U.S.C. 154(b) by 125 days.

(21) Appl. No.: 16/478,289

(22) PCT Filed: Jan. 17, 2018

(86) PCT No.: PCT/GB2018/050133
§ 371 (c)(1),
(2) Date: Jul. 16, 2019

(87) PCT Pub. No.: WO2018/134588
PCT Pub. Date: Jul. 26, 2018

(65) Prior Publication Data
US 2019/0358643 A1  Nov. 28, 2019

(30) Foreign Application Priority Data

Jan. 17, 2017  (GB) .................................... 1700774

(51) Int. Cl.
*A01G 23/06* (2006.01)
*B02C 18/18* (2006.01)

(52) U.S. Cl.
CPC ............ *A01G 23/067* (2013.01); *B02C 18/18* (2013.01)

(58) Field of Classification Search
CPC ..... B02C 13/28; B02C 13/2804; B02C 18/18; B02C 18/362; A01G 23/06; A01G 23/067; B27G 13/08; B27G 13/10
See application file for complete search history.

(56) References Cited

U.S. PATENT DOCUMENTS

| | | |
|---|---|---|
| 3,731,382 A | 5/1973 | Wroe |
| 3,783,914 A | 1/1974 | Daugherty et al. |
| 4,402,352 A | 9/1983 | Hodges |
| 4,441,534 A | 4/1984 | Wilson |
| 5,800,079 A | 9/1998 | Qvarth |
| 6,318,353 B1 | 11/2001 | Edwards et al. |
| 6,375,106 B1 | 4/2002 | Sears |
| 6,484,766 B1 | 11/2002 | Falatok et al. |
| 6,536,322 B1 | 3/2003 | Butler et al. |
| 6,546,977 B1 | 4/2003 | Monyak et al. |
| 6,550,504 B1 | 4/2003 | Leonardi et al. |

(Continued)

FOREIGN PATENT DOCUMENTS

| | | |
|---|---|---|
| CA | 2251902 A1 | 4/2000 |
| CN | 203717827 | 7/2014 |

(Continued)

OTHER PUBLICATIONS

International Search Report for PCT/GB2018/050133, dated Jun. 13, 2018, three pages.

*Primary Examiner* — Matthew Katcoff
(74) *Attorney, Agent, or Firm* — Pearne & Gordon LLP

(57) ABSTRACT

A tooth (2) for use in a grinding wheel (4), the tooth (2) including a spigot (8) for cooperating with a corresponding structure within a slot (10) of the grinding wheel (4) and a bolt (14) for locking the tooth (2) in the slot (10) of the wheel (4), and a grinding wheel (4) comprising the tooth (2).

9 Claims, 7 Drawing Sheets

(56) References Cited

U.S. PATENT DOCUMENTS

| | | | |
|---|---|---|---|
| 6,810,783 B1 | 11/2004 | Larose | |
| 7,418,986 B2* | 9/2008 | Watts | B02C 18/184 |
| | | | 144/24.12 |
| 8,109,303 B1 | 2/2012 | Holmes | |
| 9,137,955 B1 | 9/2015 | VanDusartz et al. | |
| 9,686,922 B2* | 6/2017 | Cairns | A01G 23/06 |
| 10,039,239 B2 | 8/2018 | Brand et al. | |
| 10,327,394 B2* | 6/2019 | Willibald | A01G 23/067 |
| 2003/0010178 A1 | 1/2003 | Trimpe et al. | |
| 2003/0145710 A1 | 8/2003 | Hicks | |
| 2005/0166997 A1 | 8/2005 | Shinn | |
| 2008/0245440 A1 | 10/2008 | Paumier | |
| 2009/0090434 A1 | 4/2009 | Brand et al. | |
| 2009/0159155 A1* | 6/2009 | Watts | A01G 23/067 |
| | | | 144/24.12 |
| 2010/0218851 A1 | 9/2010 | Leonardi et al. | |
| 2012/0024425 A1 | 2/2012 | Leonardi et al. | |
| 2013/0306775 A1 | 11/2013 | Cairns | |
| 2014/0027017 A1 | 1/2014 | Green et al. | |
| 2014/0260876 A1 | 9/2014 | Maclennan et al. | |
| 2014/0338790 A1 | 11/2014 | Green et al. | |
| 2016/0067841 A1 | 3/2016 | Schwaiger | |
| 2020/0015434 A1 | 1/2020 | Carson, Jr. et al. | |
| 2021/0046564 A1 | 2/2021 | Harwood et al. | |

FOREIGN PATENT DOCUMENTS

| | | |
|---|---|---|
| CN | 203717827 U | 7/2014 |
| CN | 204047420 | 12/2014 |
| CN | 204047420 U | 12/2014 |
| CN | 105210687 A | 1/2016 |
| DE | 20020390 U1 | 2/2001 |
| GB | 1103169 A | 2/1968 |
| GB | 2411564 A | 9/2005 |
| GB | 2556119 A | 5/2018 |
| GB | 2559725 A | 8/2018 |
| WO | 8704969 A1 | 8/1987 |
| WO | 9010115 A1 | 9/1990 |
| WO | 2000067388 A1 | 11/2000 |
| WO | 2005077151 A1 | 8/2005 |
| WO | 2007120059 A1 | 10/2007 |
| WO | 2009018364 A1 | 2/2009 |
| WO | 2018091913 A1 | 5/2018 |
| WO | 2022144545 A1 | 7/2022 |

* cited by examiner

TREE STUMP GRINDER

The present invention relates to tree stump grinding machines and particularly to the grinding wheel of such a machine and the associated mechanism of engaging a tooth with the grinding wheel.

It is known in the prior art to provide a tree stump grinding machine with a cutting wheel driven by a belt, a chain, shafts or hydraulic motors. Such machines are sometimes referred to as cutting machines. Current tree stump grinding machines typically consist of a circular wheel with a number of receiving brackets positioned around the rim. The receiving brackets have channels into which are fitted individual cutting teeth. Each tooth is individually mounted and a gauge is often required to set each tooth at the correct distance from the centre of the wheel. Each tooth is held in place by retaining bolts that are tightened to a very high degree in order to hold the teeth. The bolts and retaining brackets are required to take the full rotational force of the grinding action. The wheel is provided with a plurality of teeth, some of which are fitted to cut vertically, as the wheel moves along a horizontal and vertical axis. An example of such a grinding wheel is found in U.S. Pat. No. 6,484,766.

The teeth and receiving brackets provided on the grinding wheels known from the prior art have to be changed regularly as a result of the considerable wear that they encounter in use. Changing the teeth and receiving brackets is time consuming because of the set up accuracy required. Each tooth is generally held in place using two bolts to secure the receiving bracket and the tooth. The task of changing the tooth is invariably complicated by the earth and mud that clogs the teeth, brackets and bolt threads which then require cleaning prior to fitting of a new tooth. As a result of the earth and mud, the receiving thread in the cutting wheel and the bolt or bolts may become cross-threaded and require repair before a new tooth can be fitted. In addition to the expense incurred in a long down-time to change the teeth, the teeth and receiving brackets themselves are expensive because of the number of heavy duty components.

U.S. Pat. No. 6,550,504 shows an example of how a plurality of teeth can be attached to a rotor. Each tooth consists of a cutting tip and a body portion. The body portion includes two holes that allow the tooth to be attached to the rotor and the rotor is provided with corresponding pairs of holes for attaching the teeth by suitable fixing means, typically bolts, that pass through the tooth and the rotor and is then secured, typically using a nut that screws onto the bolt. In this way the tooth is mounted on the rotor.

There are two forces acting on the tooth that are of importance in this context. The first is the sheer force that prevents the tooth from slipping around the rotor and that arises because the tooth is not in the plane of the rotor. The second force is the bending moment which is a function of the distance between the fixing means and the cutting tip. In the example shown in U.S. Pat. No. 6,550,504, the cutting tips are positioned considerably out of the plane of the rotor and therefore the bolt will experience both the bending movement caused by the distance between the tip and the bolt and, in addition, the sheer force acting across the bolt.

U.S. Pat. No. 6,546,977 discloses a stump grinding device that reduces the force on the bolt by providing a cutting unit that is disposed in the plane of the rotor. Therefore the bending moment is considerably reduced in comparison with the example shown in U.S. Pat. No. 6,550,504. However, the sheer force across the bolt remains the means by which the force is transferred from the cutting tip to the rotor.

U.S. Pat. No. 6,375,106 discloses a machine that is designed to reduce waste by grinding. Although this is not the same technical field as the other art, some similar problems will be encountered. The teeth are replaceable and, unlike the previously discussed prior art, the attachment device is in the plane of the rotor. However, the tortuous cross section of the attachment device and locking element result in considerable stresses on certain parts of the interface between the rotor and the cutting tip.

EP 1175735 relates to a tooth for use in a grinding wheel wherein the tooth is held within a slot of the grinding wheel by means of a bolt. This has the problems that: (1) the centrifugal force and/or load of the assembly are entirely on the bolt. If the user over tightens the bolt, the bolt could stretch beyond its elastic capability and weaken, such that the bolt may break. Even though the instructions of a device of this arrangement may point the user to a recommended torque setting, in most cases the user doesn't pay attention to this and typically over tightens the bolt. (2) Contact with the soil eventually causes wear of the wheel just under the tooth slot. This eventually adversely affects the fit of the assembly, wherein the tooth does not fit as well as previously within the slot, thus putting extra stress onto the bolt. The typical life span of the wheel is 300 to 500 hours depending on the soil type. Expensive steel may be used to extend the life span but this is harder to machine in production. (3) The assembly is not always at a fixed distance from the centre of the wheel. If the slot is subject to wear and/or if the keeper and/or tooth are not manufactured to an exact size, the distance of the assembly with respect to the centre of the wheel may vary. In some cases, there may be a build up of tolerances which may make this problem worse. The relationship of the distance between one tooth and the next on the wheel would have an effect on the performance of the assembly.

Some previous systems have relied on a bolt to keep the tooth and keeper block in place within the grinding wheel. In these previous systems, the slot in the wheel was typically shaped to try to ensure that the tooth did not rattle during rotation of the wheel. In these previous systems, a lot of centrifugal force is applied to the bolt during rotation of the wheel as the combined weight of the tooth and wheel spinning at the speed required can be equivalent to a load in excess of 400 kg. This can result in a lot of wear and tear, requiring the components of the wheel to be replaced over a short period of time.

The present invention seeks to ameliorate the problems associated with the prior art described above.

According to a first aspect, there is provided a tooth for use in a grinding wheel, the tooth comprising means for cooperating with a corresponding structure within a slot of the grinding wheel and means for locking the tooth in the slot of the wheel.

In one embodiment, the tooth may comprise a spigot. In one embodiment, the grinding wheel may comprise a recess. In one embodiment, the spigot of the tooth fits within the recess of the grinding wheel, wherein the spigot and recess interact to lock the tooth within the slot of the wheel. In one embodiment, the recess is provided within a slot of the grinding wheel.

In another embodiment, the tooth comprises a recess which may cooperate with a spigot provided within a slot of the grinding wheel, wherein the spigot and the recess interact to lock the tooth within a slot of the wheel. Advantageously, the provision of a spigot provided within a slot of the grinding wheel and a recess provided within a tooth locates the tooth within the grinding wheel and holds the tooth in place. Advantageously, the tooth is held positively within the slot by the engagement of the spigot with the recess, holding the tooth securely within the slot.

Preferably, the tooth further comprises means for cooperating with a keeper block. Preferably, the keeper block is dimensioned to fit with the tooth within a slot of the grinding wheel. Preferably, the keeper block is attached to the tooth by means of a bolt. It is preferred that the bolt passes through the keeper block and attaches to a rear portion of the tooth.

Preferably, the tooth comprises a threaded portion through which the bolt may pass. It is preferred that the threaded portion that the bolt screws into is part of the tooth. Advantageously, the bolt winds into the thread provided within the tooth. In previous systems, a threaded insert or a tapped hole was typically provided in the grinding wheel. Advantageously, the arrangement of the present invention wherein the tooth comprises a threaded portion means that one less component is required in the system, thus facilitating manufacture and minimising the amount of work required to make the wheel. In addition, the arrangement of the present invention has the advantage that the thread is changed when the tooth is changed as the thread is part of the tooth (i.e. the thread and tooth are part of the same component), thus improving the safety of using a tooth and a grinding wheel in accordance with the present invention.

Preferably, the keeper block is counter bored to allow passage of the bolt through the keeper block. Preferably, the bolt is attached to the tooth by means of a threaded engagement. Preferably, the keeper block is shaped such that it corresponds with the shape of the tooth, such that the combination of the keeper block and tooth fit within a slot of the grinding wheel. Typically, the underside of the keeper block is provided with a tapered surface that interfaces with the surface of the tooth. Typically, the taper on the lower surface of the keeper block is approximately 11°. The keeper block and tooth advantageously fit together and are sized to fit within the slot of the grinding wheel. Advantageously, the keeper block and tooth move together relative to the slot provided within the grinding wheel. Advantageously, the keeper block and tooth are held securely within the slot. In one embodiment, the tooth and keeper block may be formed as one component. In another embodiment, the tooth and keeper block may be separate components.

In previous systems, the tooth was typically not held securely within the slot of the grinding wheel and could move backwards and forwards within the slot. The present system advantageously allows for the tooth to be held securely within the slot of the grinding wheel.

Advantageously, the tooth is locked in place by pulling a wedged keeper block in and forcing the spigot on the lower part of the tooth into the recess in the wheel, or alternatively, by forcing the spigot provided on the wheel into the recess provided on the tooth. Advantageously, the provision of the spigot on the grinding wheel locates the tooth within the wheel and holds the tooth in place. Advantageously, the provision of the spigot within a slot of the grinding wheel which engages with a corresponding recess provided within the tooth holds the tooth securely within the slot of the grinding wheel. Thus, the tooth advantageously locates positively within the slot in the wheel.

Advantageously, the engagement of the spigot with the recess provides an interfitting, positive mechanical engagement. Advantageously, the engagement of the recess with the spigot provides an interfitting, positive mechanical engagement. This is in contrast to previous systems which involved a fit under tension from a screw. Advantageously, the present invention uses forces in the radial, tangential and axial directions relative to the axis of rotation of the grinding wheel, wherein the force in the radial direction is provided by the reaction surfaces between the spigot and the recess, and the force in the tangential direction is provided by the tapered keeper block and the surfaces on either side thereof, and the force in the axial direction is provided by the walls of the slot within the tooth.

In addition, the interlocking of the spigot and the recess advantageously means that the wheel will take the major centrifugal forces created by the tooth during rotation of the wheel, thus minimising wear of the wheel and tooth. Advantageously, the bolt now only has to keep the keeper block in place which results in a much lower force being applied to the bolt during rotation. In addition, the interaction of the spigot and recess has the further advantage that the tooth is located in one position in the wheel and can't slide further as the slot wears. Advantageously, the tooth is held in position within the wheel. Advantageously, the provision of a spigot on the wheel which engages with a recess on the tooth holds the tooth in place during rotation and enables the wheel to take the centrifugal forces created by the tooth during rotation of the wheel. Advantageously, the provision of the spigot on the wheel locates the tooth and holds it in position within the wheel.

In one embodiment, the keeper block and tooth may be combined and provided as one component. In this embodiment, the load on the keeper block and tooth would typically be similar. In another embodiment, the keeper block and tooth may be provided as separate components. In one embodiment, the spigot and recess may be provided between the keeper block and the tooth. In one embodiment, the interlocking between the spigot and recess may occur between the keeper block and the tooth. In another embodiment, the spigot or recess may be provided on the keeper block and may interlock with a corresponding recess or spigot provided on the tooth or within the slot of the wheel. In one embodiment, the spigot may be provided on the keeper block which may engage with a recess provided on the tooth.

Preferably, the tooth comprises a main body including a slot comprising two substantially planar surfaces for, in use, engaging with the keeper block. Preferably, the tooth comprises a tapered channel on the upper surface thereof. Preferably, the tooth comprises one or more cutting face connected to and extending away from the main body.

Preferably, the cutting face includes one or more tips. In an embodiment wherein the tooth comprises two or more tips, the tips may be perpendicular to each other. In another embodiment, the multi-tipped tooth may have protruding transverse tips to facilitate lateral grinding, in addition to radial tips. Such a multi-tipped tooth allows for cutting in radial and lateral dimensions simultaneously.

Some advantages of embodiments of the present invention are: (1) the tooth may be quickly removed and replaced within the grinding wheel; (2) the tooth has good performance; (3) the only part of the assembly, excluding the wheel, that wears is the tooth; (4) the keeper block, threaded insert and bolt are protected by the tooth; (5) typically, only one relatively small bolt is required because all of the forces are taken up through the wheel. Previous systems had pockets on both side faces of the wheel which would hold the teeth; (5) typically, the bolt is not taking the centrifugal force of the whole assembly (typically approximately 0.74 kg), but instead has the centrifugal force of itself and the small keeper block; (6) typically, there are fewer components, or, in the case where the wheel has been drilled and tapped instead of using a threaded insert, extra machining is not required; (7) preferably, a section is included within the tooth that protects the wheel from wear, such that standard mild steel can be used which is cheaper and easier to machine than the material used in conventional equipment, such that the wheel that may be used with the present invention may last up to ten times longer than previous wheels. Advantageously, the assembly of the present invention is at a fixed position relative to the centre of the wheel, such that the variability in performance found with previous wheels is minimised resulting in perfect performance every time.

Advantageously, the wheel absorbs a substantial proportion of the forces in the plane of the grinding wheel resulting from the grinding action. Advantageously, the interaction between the spigot and recess provides for a secure interaction between the grinding wheel and the tooth. Advantageously, the means for locking the tooth within a slot of the wheel provides for a secure attachment of the tooth within the wheel. Advantageously, the provision of cooperating interlocking structures in the form of a recess and spigot on the tooth and the wheel provide for a secure attachment of the tooth and the wheel.

When the term "slot" is used in this specification, it is intended to refer to any physical configuration that provides two planar surfaces that enable the interlocking of a second piece. In particular, a simple slot may be provided in the circumference of the grinding wheel by cutting a substantially U-shaped gap in the periphery of the wheel thus providing two substantially planar surfaces into which a tooth may be slotted in use. Preferably, the slots may be arranged in diametrically opposed pairs wherein the slots in an opposing pair of slots are the same distance from the axis. Preferably, the slots are arranged in two diametrically opposed series, each successive slot in each series having an increased distance from the axis.

The number of slots is preferably 4, 6, 8, 10 or 12. Some or all of the slots may be angled either towards or away from the axis of rotation of the grinding wheel. If the slots are angled towards the axis of rotation, the teeth will protrude perpendicular to the rim of the grinding wheel and will therefore, dependent on the configuration of cutting tips of the teeth, the grinding wheel could be rotated in either direction.

According to a second aspect, there is provided a grinding wheel comprising a tooth in accordance with the first aspect.

Preferably, the grinding wheel comprises a slot, wherein the tooth comprises means for cooperating with a corresponding structure within the slot of the grinding wheel and means for locking the tooth in the slot of the wheel.

In one embodiment, the grinding wheel comprises a recess which may engage with a spigot provided on the tooth.

In another embodiment, the grinding wheel comprises a spigot which may engage with a recess provided on the tooth.

Preferably, the recess or spigot is provided within a slot of the grinding wheel.

Preferably, the recess cooperates with the spigot to lock the tooth within the slot of the grinding wheel.

Advantageously, the engagement of the spigot with the recess provides an interfitting, positive mechanical engagement. Advantageously, the engagement of the recess with the spigot provides an interfitting, positive mechanical engagement. This is in contrast to previous systems which involved a fit under tension from a screw. Advantageously, the present invention uses forces in the radial, tangential and axial directions relative to the axis of rotation of the grinding wheel, wherein the force in the radial direction is provided by the reaction surfaces between the spigot and the recess, and the force in the tangential direction is provided by the tapered keeper block and the surfaces on either side thereof, and the force in the axial direction is provided by the walls of the slot within the tooth.

In addition, the interlocking of the spigot and the recess advantageously means that the wheel will take the centrifugal forces created by the tooth during rotation of the wheel, thus minimising wear of the wheel and tooth. Advantageously, the bolt now only has to keep the keeper block in place which results in a much lower force being applied to the bolt during rotation. In addition, the interaction of the spigot and recess has the further advantage that the tooth is located in one position in the wheel and can't slide further as the slot wears. Advantageously, the provision of a spigot on the wheel which engages with a recess on the tooth holds the tooth in place during rotation and enables the wheel to take the centrifugal forces created by the tooth during rotation of the wheel.

According to a third aspect, there is provided a cutting apparatus comprising a grinding wheel in accordance with the second aspect and a tooth in accordance with the first aspect.

According to a fourth aspect, there is provided a method of engaging a tooth according to the first aspect with a grinding wheel according to the second aspect.

The invention will further be described by way of example, with reference to the accompanying drawings, in which:

FIG. 1(*b*) is an assembled side view of the apparatus of FIG. 1;

FIG. 1(*c*) is an exploded perspective view of the apparatus according to the invention;

FIG. 1(*d*) is an assembled perspective view of the apparatus of FIG. 3;

FIG. 9(*b*) is a side view of a tool in combination with part of the apparatus of the invention.

Figure 1:
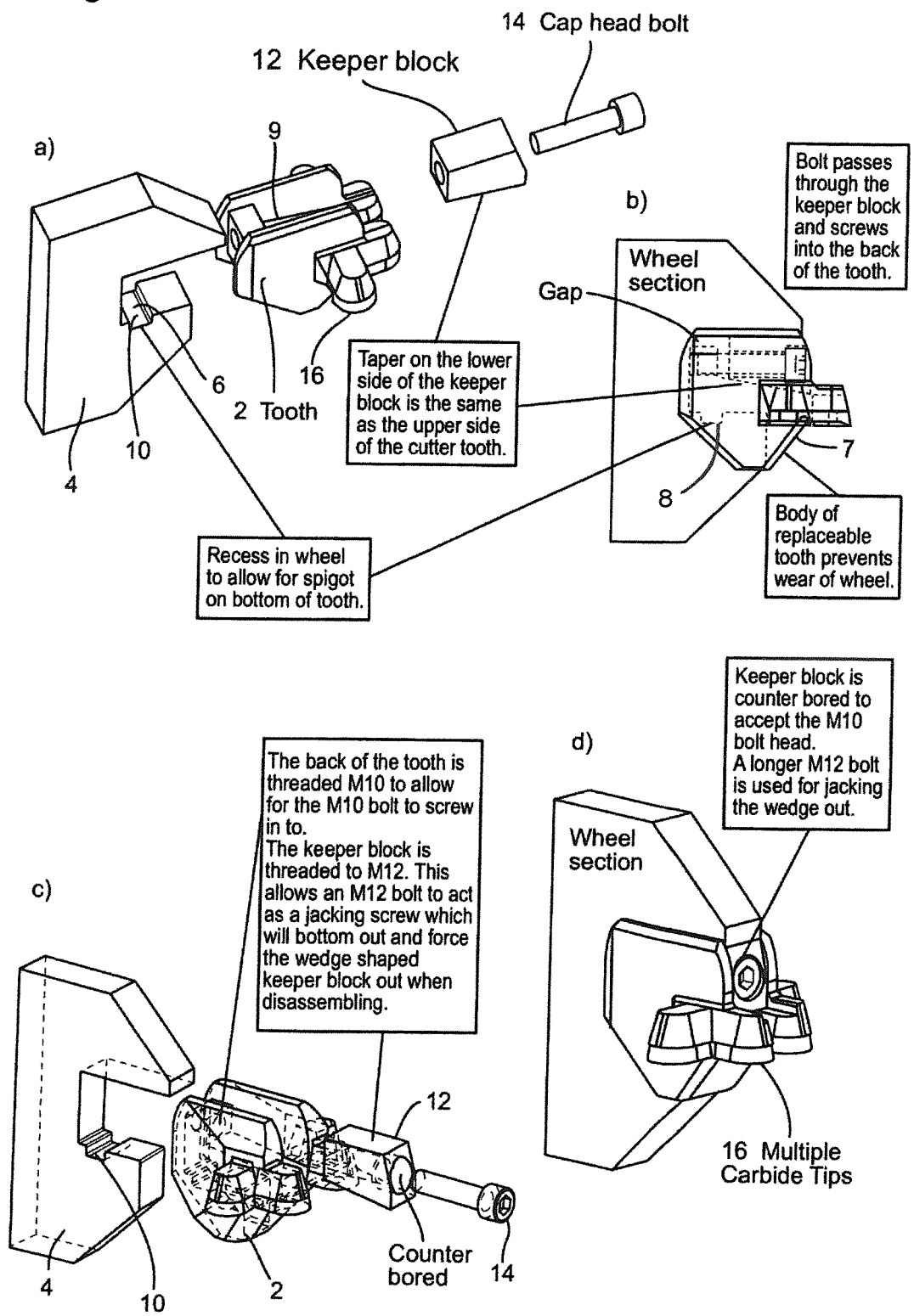
FIG. 1(*a*) is an exploded perspective view of the apparatus according to the invention.

With reference to FIG. 1, there is provided a tooth 2 for use in a grinding wheel 4, the tooth comprising means 8 for cooperating with a recess 6 within the grinding wheel 4 and means for locking 14 the tooth in the recess of the wheel.

The tooth comprises a spigot 8 which fits within the recess 6 of the grinding wheel 4. The recess 6 is provided within a slot 10 of the grinding wheel.

Figure 2:
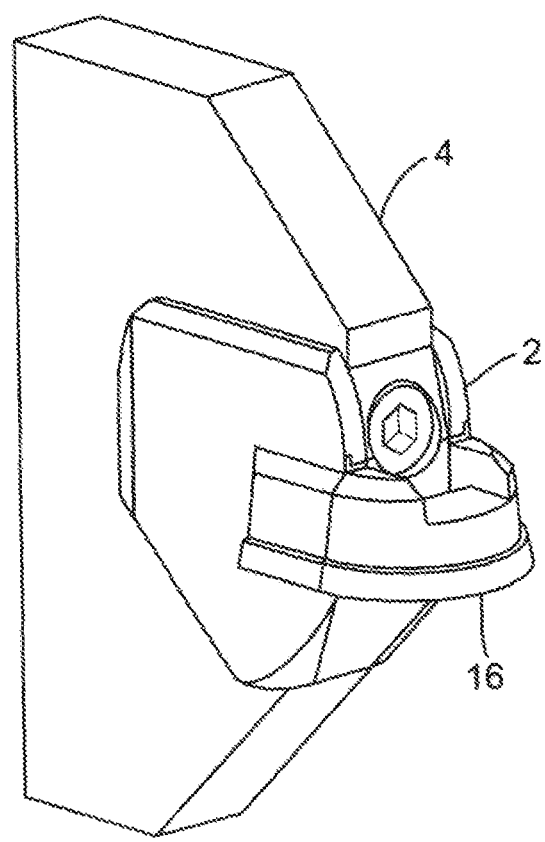
FIG. 2 is an assembled view of apparatus according to an embodiment of the invention.
Figure 3:
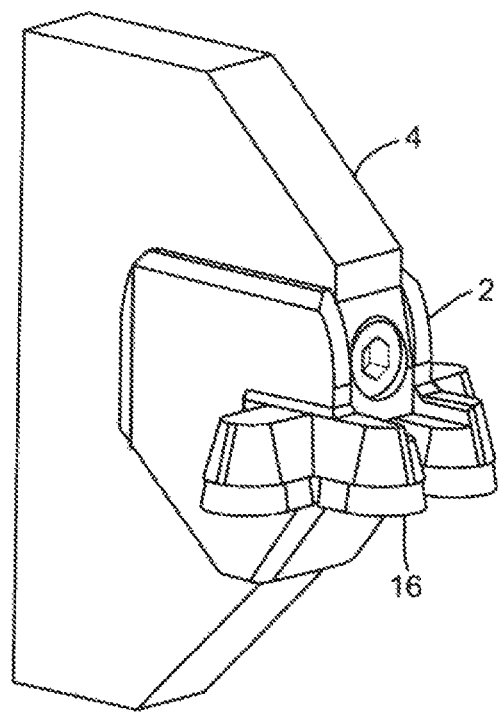
FIG. 3 is a perspective view of apparatus according to another embodiment of the invention.
Figure 4:
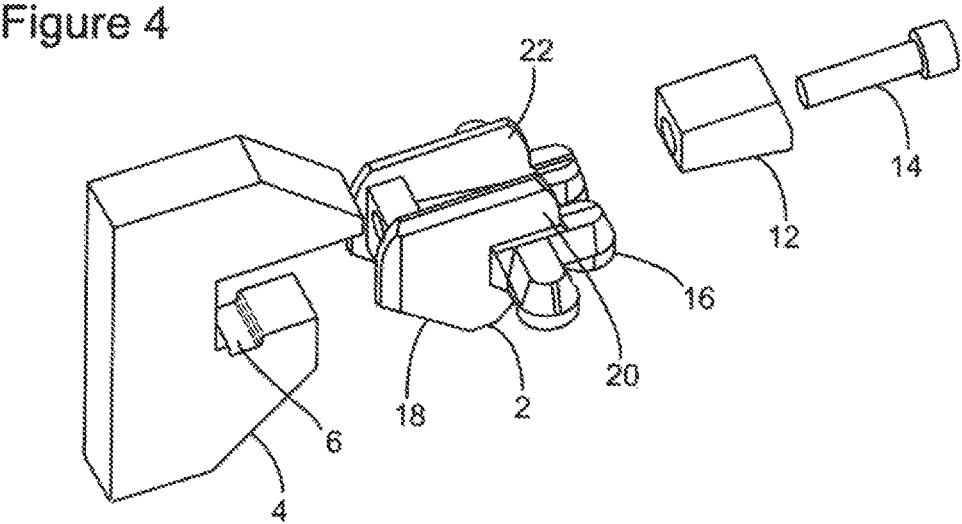
FIG. 4 is an exploded perspective view of apparatus according to another embodiment of the invention.
Figure 5:
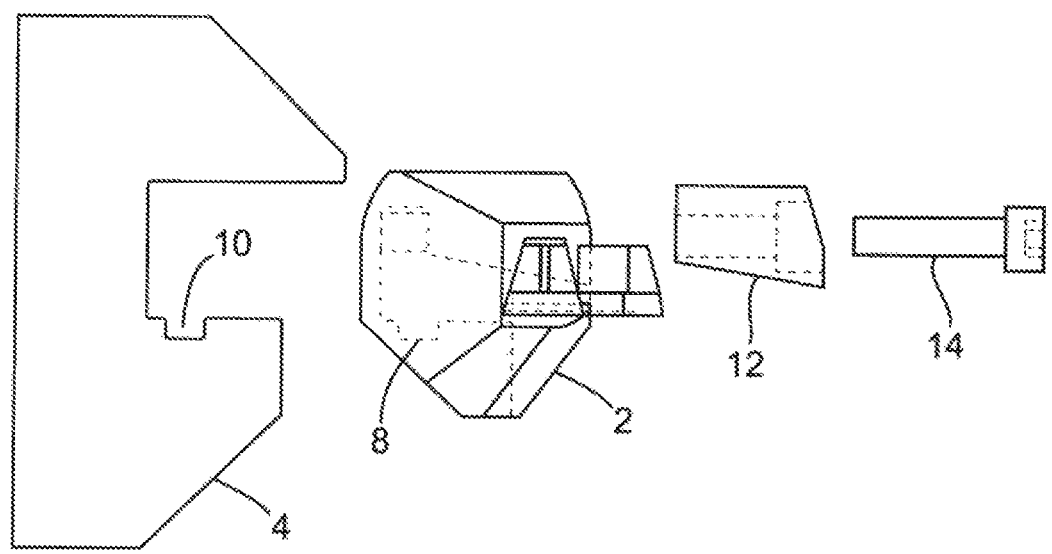
FIG. 5 is a plan side view of apparatus according to an embodiment of the invention.
Figure 6:
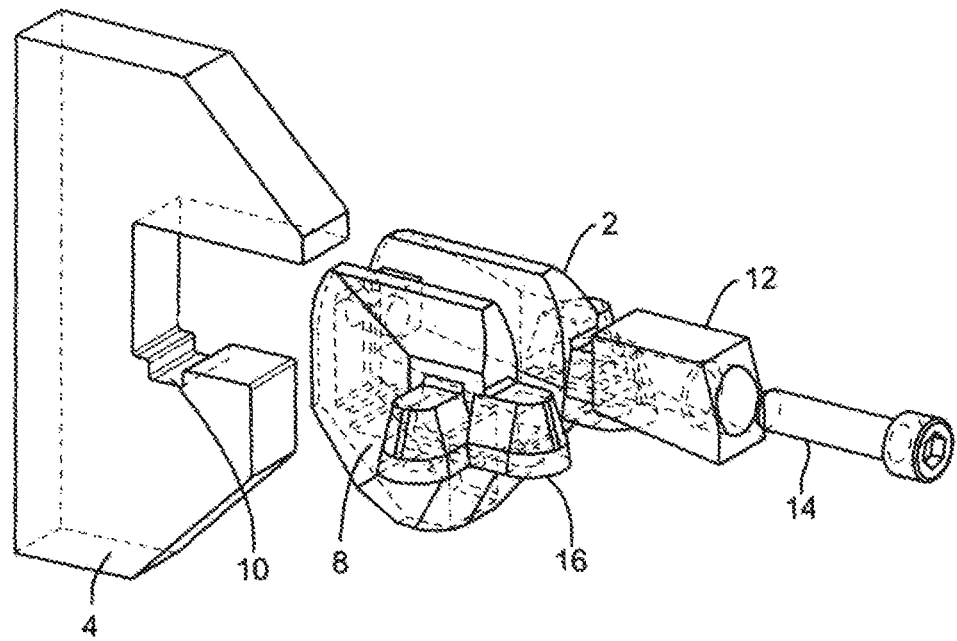
FIG. 6 is an exploded perspective view of apparatus according to an embodiment of the invention.
Figure 7:
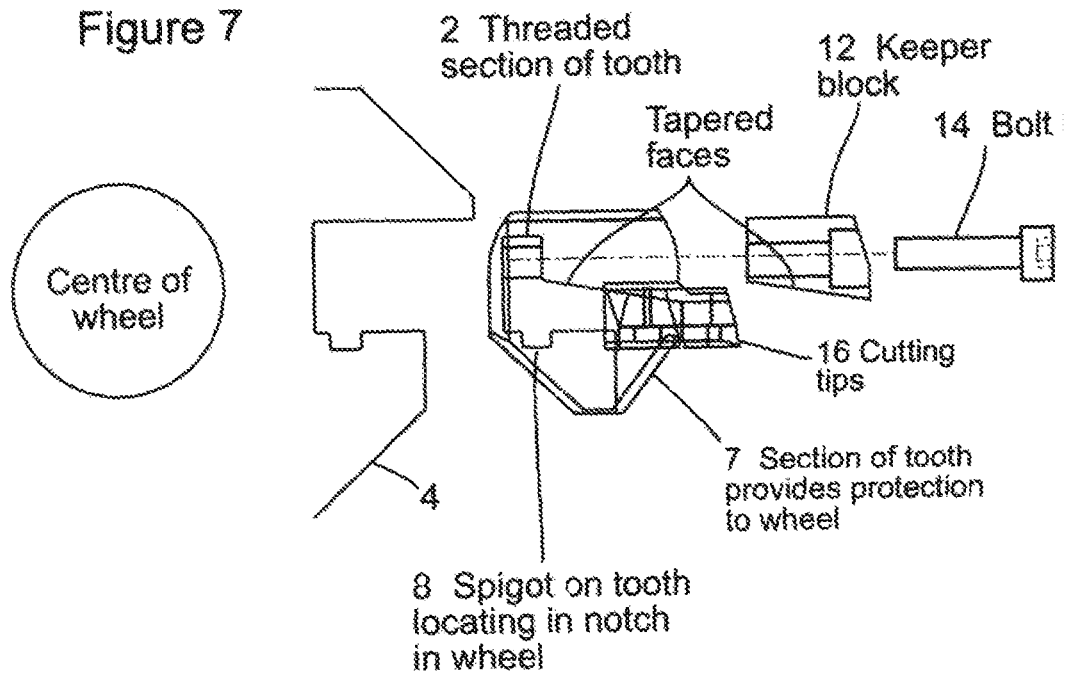
FIG. 7 is a plan side view of apparatus according to an embodiment of the invention.
Figure 8:
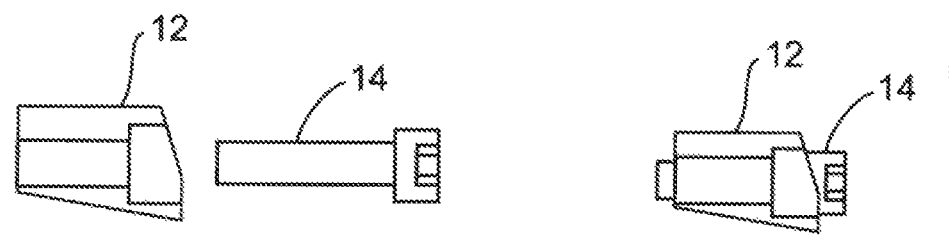
FIG. 8 is a side plan view of a part of apparatus according to an embodiment of the invention.

The tooth further comprises means for cooperating with a keeper block 12, wherein the keeper block is dimensioned to fit with the tooth 2 within a slot 10 of the grinding wheel 4. As shown in FIG. 2, the keeper block 12 is attached to the tooth 2 by means of a bolt 14, wherein the bolt 14 passes through the keeper block 12 and attaches to a rear portion of the tooth 2. Preferably, the bolt 14 is attached to the tooth 2 by means of a threaded engagement. Preferably, the bolt 14 passes through the keeper block 12 and screws into the back portion of the tooth 2. Advantageously, the tooth of the present invention does not require a bolt 14 to be attached to the grinding wheel 4, thus preventing wear of the wheel over time. Advantageously, the locking mechanism allows for replacement of the tooth 2 and keeper 12 components instead of the wheel 4 during wear. Preferably, the keeper block is counter bored and tapped to M12. The bolt is preferably an M10 socket cap which typically passes directly through the tapped hole and screws into a threaded M10 hole in the tooth. Advantageously, the head of the bolt sits in and is protected by the counter-bored section of the keeper block (see FIG. 8).

With reference to FIG. 1, the keeper block 12 is shaped such that it corresponds with the shape of the tooth 2, such that the combination of the keeper block 12 and tooth 2 fit within a slot of the grinding wheel 4. The underside of the keeper block is provided with a tapered surface that interfaces with the surface of the tooth. Typically, the taper on the lower surface of the keeper block is approximately 11°. The keeper block 12 and tooth 2 advantageously fit together and are sized to fit within the slot 10 of the grinding wheel 4. Advantageously, the keeper block 12 and tooth 2 move together relative to the slot 10 provided within the grinding wheel 4. Advantageously, the attachment of the keeper block of the present invention to the tooth by means of a bolt allows for a shorter bolt to be used than in previous assemblies.

The tooth 2 comprises a main body 18 including a slot comprising two substantially planar 20, 22 surfaces for, in use, engaging with the keeper block 12. The tooth 2 comprises one or more cutting face 16 connected to and extending away from the main body, wherein the cutting face includes one or more tips 16. In the embodiment wherein the tooth 2 comprises two or more tips 16, the tips may be perpendicular to each other. In another embodiment, the multi-tipped tooth may have protruding transverse tips to facilitate lateral grinding, in addition to radial tips. Such a multi-tipped tooth allows for cutting in radial and lateral dimensions simultaneously. The tips 16 may comprise a carbide material. Advantageously, the tooth 2 may comprise a region 7 comprising replaceable components to prevent wear of the wheel.

In the embodiment shown in FIG. 1(*c*), the rear of the tooth 2 is provided with a threaded M10 to allow for a corresponding M10 bolt to screw into the tooth. The keeper block 12 is preferably threaded to M12. This allows an M12 bolt 14 to act as a jacking screw which will bottom out and force the wedge shaped keeper block out when disassembling. Preferably, the keeper block 12 is counter bored to allow the bolt 14 to pass therethrough, as shown in FIG. 1(*d*).

In the embodiment shown in FIG. 1(*d*), the keeper block 12 is counted bored to accept an M10 bolt head. A longer M12 bolt is used as a jacking screw which will force the wedge shaped keeper block out when disassembling. In the embodiment shown in FIG. 1(*d*), the tooth comprises multiple tips 16, wherein the tips provide the cutting face of the tooth. In this embodiment, each of the tips comprises carbide material. Advantageously, the hard carbide tips reduce wear of the assembly and allow the teeth to last longer, especially when the teeth come into contact with soil.

Advantageously, the arrangement of the present invention wherein the tooth comprises a threaded portion means that one less component is required in the system, thus facilitating manufacture of the wheel and tooth. In addition, the provision of a tooth comprising a threaded portion has the advantage that the thread is changed when the tooth is changed, thus improving the safety associated with using a wheel and a tooth in accordance with the present invention.

Figure 9:
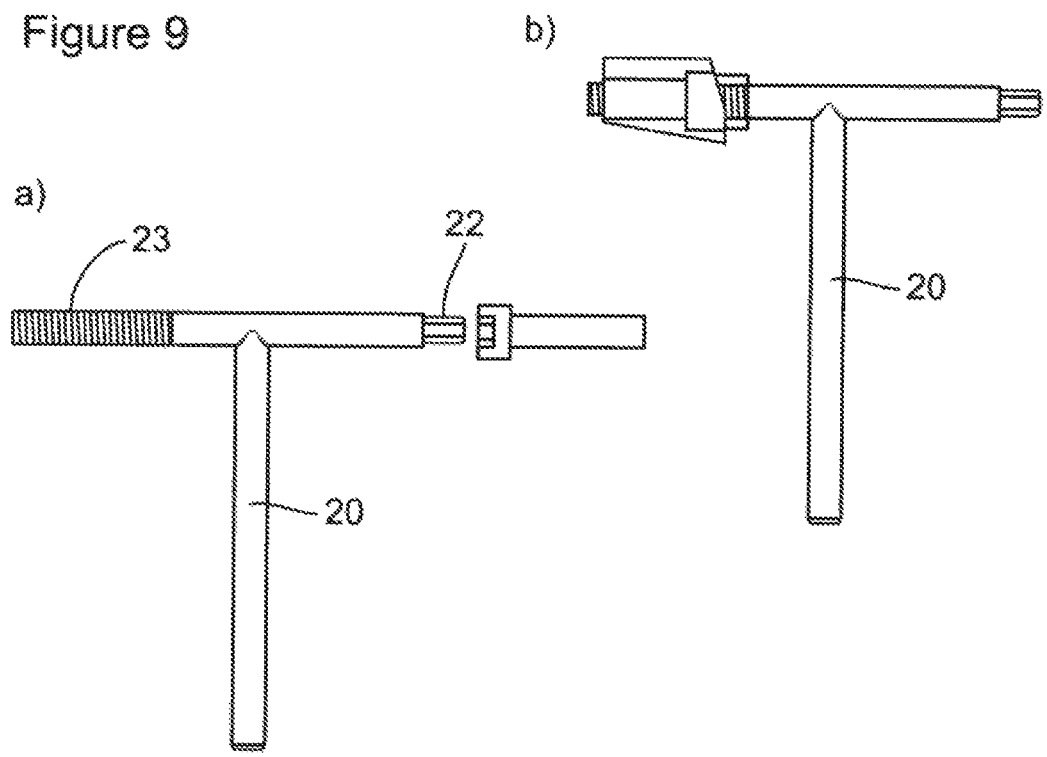
FIG. 9(*a*) is a side view of a tool that may be used with part of the apparatus of the invention.

Advantageously, only one tool 20 is required to drill the bolt into the keeper block and tooth, as shown in FIG. 9. One end 22 of the tool typically has an 8 mm hex head which fits into the M10 bolt head for tightening. The other end 23 of the tool is typically tapped to M12. This is used for extracting the keeper block. Once the bolt has been removed, the threaded end screws into the keeper block and bottoms out on the back of the tooth. Continuing to wind the thread in will push the keeper block out. Then the tooth can be removed freely. This is in contrast with previous systems where two tools are typically required, an allen key and a hammer. In previous systems, the hammer is used to knock the tooth out of the slot after the bolt has been removed.

In the embodiment shown in FIG. 2, the tooth 2 comprises a single tip 16. The locking mechanism of this embodiment is the same as that described above in relation to FIG. 1.

During rotation, the wheel 4 absorbs a substantial proportion of the forces in the plane of the grinding wheel resulting from the grinding action. The locking mechanism of the invention assists in retaining the tooth 2 in place within the slot 10 as the grinding wheel 4 rotates.

When the term "slot" is used in this specification, it is intended to refer to any physical configuration that provides two planar surfaces that enable the interlocking of a second piece. In particular, a simple slot may be provided in the circumference of the grinding wheel by cutting a substantially U-shaped gap in the periphery of the wheel thus providing two substantially planar surfaces into which a tooth may be slotted in use. Preferably, the slots may be arranged in diametrically opposed pairs wherein the slots in an opposing pair of slots are the same distance from the axis. Preferably, the slots are arranged in two diametrically opposed series, each successive slot in each series having an increased distance from the axis.

The number of slots is preferably 4, 6, 8, 10 or 12. Some or all of the slots may be angled either towards or away from the axis of rotation of the grinding wheel. If the slots are angled towards the axis of rotation, the teeth will protrude perpendicular to the rim of the grinding wheel and will therefore, dependent on the configuration of cutting tips of the teeth, the grinding wheel could be rotated in either direction.

Thus, preferably the tooth of the invention comprises one or more cutter tips, a spigot in the underside of the channel which locates in a recess provided within a slot of the wheel, a tapered channel on the upper side of the tooth, and/or a threaded section at the back of the tooth. Preferably, the keeper block is tapered on the underside and/or comprises a counter-bored hole from the front to the back. The apparatus of the invention preferably further comprises a bolt.

In use, in one embodiment, the tooth 2 may be fitted by locating the spigot 8 in the recess 10 of the wheel 4. The keeper block 12 preferably comprises a tapered surface which slides into a tapered channel 9 provided on an upper surface of the tooth 2. The bolt 14 preferably passes through the keeper block 12 and screws into the back of the tooth 2. As the keeper block 12 is pulled in, it typically pushes the spigot 8 on the underside of the tooth 2 firmly into the recess 10 in the wheel 4 and locks the assembly tightly in place.

Figure 10:
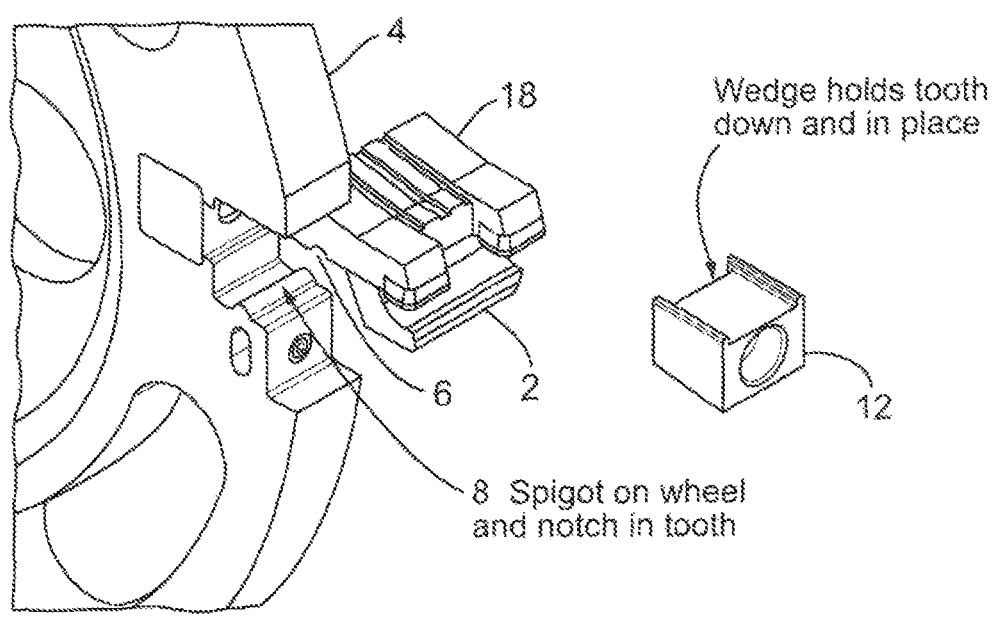
FIG. 10 is a perspective view of apparatus according to an embodiment of the invention.

According to a FIG. 10, there is provided a tooth 2 for use in a grinding wheel 4, the tooth 2 comprising means 8 for cooperating with a corresponding structure within a slot 10 of the grinding wheel and means 14 for locking the tooth in the slot of the wheel. In this embodiment, the tooth comprises a recess 6 which accommodates a spigot 8 provided within the grinding wheel. Advantageously, the provision of a spigot provided within the grinding wheel and a recess provided within a tooth locates the tooth within the grinding wheel and holds the tooth in place. Advantageously, the tooth is held positively within the slot by the engagement of the spigot with the recess, holding the tooth securely within the slot. This interlocking between the cooperating structures on the tooth and the wheel means that the wheel will take the major centrifugal forces created by the tooth during rotation of the wheel. The bolt now only has to keep the keeper block in place. This results in much less force being applied to the bolt. In addition, this arrangement has the advantage that the tooth is located in one position in the wheel and can't slide further into the slot as the slot wears. In particular, the provision of a spigot on the wheel which interacts with a recess on the tooth enhances and provides for a secure locking of the tooth within the wheel, thus allowing the wheel to take the major centrifugal forces created by the tooth during rotation.

In this embodiment, the tooth further comprises means for cooperating with a keeper block 12, wherein the keeper block is dimensioned to fit with the tooth 2 within a slot of the grinding wheel 4. The keeper block 12 is attached to the tooth 2 by means of a bolt 14, wherein the bolt 14 passes through the keeper block 12 and attaches to a rear portion of the tooth 2. Preferably, the bolt 14 is attached to the tooth 2 by means of a threaded engagement. Preferably, the bolt 14 passes through the keeper block 12 and screws into the back portion of the tooth 2. Advantageously, the tooth of the present invention does not require a bolt 14 to be attached to the grinding wheel 4, thus preventing wear of the wheel over time. Advantageously, the locking mechanism allows for replacement of the tooth 2 and keeper 12 components instead of the wheel 4 during wear. Preferably, the keeper block is counter bored and tapped to M12. The bolt is preferably an M10 socket cap which typically passes directly through the tapped hole and screws into a threaded M10 hole in the tooth. Advantageously, the head of the bolt sits in and is protected by the counter-bored section of the keeper block.

With reference to FIG. 10, the keeper block 12 (also known as a wedge) is shaped such that it corresponds with the shape of the tooth 2, such that the combination of the keeper block 12 and tooth 2 fit within a slot of the grinding wheel 4. The underside of the keeper block is provided with a tapered surface that interfaces with the surface of the tooth. Typically, the taper on the lower surface of the keeper block is approximately 11°. The keeper block 12 and tooth 2 advantageously fit together and are sized to fit within the slot 10 of the grinding wheel 4. Advantageously, the keeper block 12 and tooth 2 move together relative to the slot 10 provided within the grinding wheel 4. Advantageously, the attachment of the keeper block of the present invention to the tooth by means of a bolt allows for a shorter bolt to be used than in previous assemblies.

The tooth 2 comprises a main body 18 including a slot comprising two substantially planar 20, 22 surfaces for, in use, engaging with the keeper block 12. The tooth 2 comprises one or more cutting face 16 connected to and extending away from the main body, wherein the cutting face includes one or more tips 16. In the embodiment wherein the tooth 2 comprises two or more tips 16, the tips may be perpendicular to each other. In another embodiment, the multi-tipped tooth may have protruding transverse tips to facilitate lateral grinding, in addition to radial tips. Such a multi-tipped tooth allows for cutting in radial and lateral dimensions simultaneously. The tips 16 may comprise a carbide material. Advantageously, the tooth 2 may comprise a region 7 comprising replaceable components to prevent wear of the wheel.

Advantageously, only one tool 20 is required to drill the bolt into the keeper block and tooth, as shown in FIG. 9. One end 22 of the tool typically has an 8 mm hex head which fits into the M10 bolt head for tightening. The other end 23 of the tool is typically tapped to M12. This is used for extracting the keeper block. Once the bolt has been removed, the threaded end screws into the keeper block and bottoms out on the back of the tooth. Continuing to wind the thread in will push the keeper block out. Then the tooth can be removed freely. This is in contrast with previous systems where two tools are typically required, an allen key and a hammer. In previous systems, the hammer is used to knock the tooth out of the slot after the bolt has been removed.

During rotation, the wheel 4 absorbs a substantial proportion of the forces in the plane of the grinding wheel resulting from the grinding action. The locking mechanism of the invention assists in retaining the tooth 2 in place within the slot 10 as the grinding wheel 4 rotates.

When the term "slot" is used in this specification, it is intended to refer to any physical configuration that provides two planar surfaces that enable the interlocking of a second piece. In particular, a simple slot may be provided in the circumference of the grinding wheel by cutting a substantially U-shaped gap in the periphery of the wheel thus providing two substantially planar surfaces into which a tooth may be slotted in use. Preferably, the slots may be arranged in diametrically opposed pairs wherein the slots in an opposing pair of slots are the same distance from the axis. Preferably, the slots are arranged in two diametrically opposed series, each successive slot in each series having an increased distance from the axis.

The number of slots is preferably 4, 6, 8, 10 or 12. Some or all of the slots may be angled either towards or away from the axis of rotation of the grinding wheel. If the slots are angled towards the axis of rotation, the teeth will protrude perpendicular to the rim of the grinding wheel and will therefore, dependent on the configuration of cutting tips of the teeth, the grinding wheel could be rotated in either direction.

Thus, preferably the tooth of the invention comprises one or more cutter tips, a spigot in the underside of the channel which locates in a recess provided within a slot of the wheel, a tapered channel on the upper side of the tooth, and/or a threaded section at the back of the tooth. Preferably, the keeper block is tapered on the underside and/or comprises a counter-bored hole from the front to the back. The apparatus of the invention preferably further comprises a bolt.

In the embodiment of FIG. 10, in use, the spigot 8 may be provided on the wheel 4 and the recess 6 may be provided on the tooth 2. The keeper block 12 preferably comprises a tapered surface which slides into a tapered channel 9 provided on an upper surface of the tooth 2. The bolt 14 preferably passes through the keeper block 12 and screws into the back of the tooth 2. As the keeper block 12 is pulled in, it typically pushes the spigot 8 on the underside of the tooth 2 firmly into the recess 6 in the wheel 4 and locks the assembly tightly in place. Thus, in this embodiment, the tooth 2 is held securely within the wheel 4.

The invention claimed is:

1. A cutting apparatus comprising a tooth, a grinding wheel, a keeper block, and a bolt, wherein:
   the tooth comprises a recess;
   the grinding wheel comprises a slot and a spigot;
   the spigot is provided within the slot of the grinding wheel;
   the tooth cooperates with the grinding wheel by means of the spigot of the grinding wheel fitting within the recess of the tooth;
   the keeper block is dimensioned to fit with the tooth within the slot of the grinding wheel;
   the keeper block cooperates with the tooth by means of the bolt;
   the bolt passes through the keeper block and attaches to a rear portion of the tooth; and
   the bolt locks the tooth in the slot of the grinding wheel.

2. The cutting apparatus of claim 1, wherein the bolt is attached to the tooth by means of a threaded engagement.

3. The cutting apparatus of claim 1, wherein the keeper block is shaped such that it corresponds with the shape of the tooth, such that the combination of the keeper block and tooth fit within the slot of the grinding wheel.

4. The cutting apparatus of claim 1, wherein the keeper block has an underside, and the underside of the keeper block is provided with a tapered surface that interfaces with the surface of the tooth.

5. The cutting apparatus of claim 4, wherein the taper on the lower surface of the keeper block is approximately 11°.

6. The cutting apparatus of claim 1, wherein the tooth comprises a main body including a slot comprising two substantially planar surfaces for, in use, engaging with the keeper block.

7. The cutting apparatus of claim 6, wherein the tooth comprises one or more cutting faces connected to and extending away from the main body.

8. The cutting apparatus of claim 7, wherein the cutting face includes one or more tips.

9. A method of making the cutting apparatus of claim 1 comprising engaging the tooth with the grinding wheel.

\* \* \* \* \*